United States Patent
Purdy et al.

(10) Patent No.: US 8,474,188 B2
(45) Date of Patent: Jul. 2, 2013

(54) CARRIER HAVING A LIVING HINGE

(75) Inventors: Christopher E. Purdy, Fenton, MI (US); Brett Stone, West Bloomfield, MI (US); Peter P. Butala, IV, White Lake, MI (US); Greg Zunich, White Lake, MI (US); Brian Nordstrom, Allen Park, MI (US)

(73) Assignee: Henniges Automotive Sealing Systems North America, Inc., Farmington, MI (US)

( * ) Notice: Subject to any disclaimer, the term of this patent is extended or adjusted under 35 U.S.C. 154(b) by 281 days.

(21) Appl. No.: 12/857,057

(22) Filed: Aug. 16, 2010

(65) Prior Publication Data

US 2012/0036788 A1    Feb. 16, 2012

(51) Int. Cl.
  *E05F 7/00*    (2006.01)
  *B60J 5/00*    (2006.01)

(52) U.S. Cl.
  USPC ............................. 49/462; 49/475.1; 49/490.1

(58) Field of Classification Search
  USPC ...................................... 49/462, 475.1, 490.1
  See application file for complete search history.

(56) References Cited

U.S. PATENT DOCUMENTS

| | | | | |
|---|---|---|---|---|
| 2,212,551 | A * | 8/1940 | Reid ............................... | 296/209 |
| 2,240,181 | A * | 4/1941 | Fairbank ........................ | 296/199 |
| 2,761,728 | A * | 9/1956 | Wernig .......................... | 49/475.1 |
| 2,831,723 | A * | 4/1958 | Adell .............................. | 49/462 |
| 2,902,313 | A * | 9/1959 | Adell .............................. | 49/462 |
| 2,902,314 | A * | 9/1959 | Adell .............................. | 49/462 |
| 2,923,571 | A * | 2/1960 | Adell .............................. | 49/462 |
| 2,929,656 | A * | 3/1960 | Adell .............................. | 49/462 |
| 2,978,846 | A * | 4/1961 | Barron .......................... | 451/541 |
| 3,393,471 | A * | 7/1968 | Skowlund et al. ............ | 49/475.1 |
| 4,587,762 | A * | 5/1986 | Adell .............................. | 49/462 |
| 5,499,782 | A * | 3/1996 | Domine ........................ | 244/1 A |
| 5,513,603 | A * | 5/1996 | Ang et al. .................... | 123/90.37 |
| 6,113,664 | A * | 9/2000 | Zievers et al. ................. | 55/523 |
| 6,211,092 | B1 * | 4/2001 | Tang et al. .................... | 438/719 |
| 6,266,924 | B1 * | 7/2001 | Rissone ......................... | 49/308 |
| 6,634,613 | B1 * | 10/2003 | Kaper et al. ............. | 248/346.01 |
| 6,966,601 | B2 * | 11/2005 | Matsumoto et al. ....... | 296/146.2 |
| 7,121,531 | B1 * | 10/2006 | Gonzalez ........................ | 256/73 |
| 7,128,506 | B2 * | 10/2006 | Ferrari et al. ................. | 409/201 |
| 7,354,102 | B2 * | 4/2008 | Cave et al. .................... | 296/209 |
| 7,363,749 | B2 * | 4/2008 | Sultan et al. ................. | 49/490.1 |

(Continued)

*Primary Examiner* — Katherine Mitchell
*Assistant Examiner* — Shiref Mekhaeil
(74) *Attorney, Agent, or Firm* — Howard & Howard Attorneys PLLC

(57) ABSTRACT

The present invention provides for a weatherstrip assembly for a motor vehicle. The assembly includes a carrier having a base and a first and second leg extending from the base to a first and second distal end, respectively. The legs are spaced from each other to define a channel for receiving the motor vehicle. A seal is mounted to the first distal end. At least one securing flange is coupled to the second distal end for fastening the carrier to the motor vehicle. A living hinge is disposed between the securing flange and the second distal end, such that the securing flange is moveable independent of the carrier. The living hinge comprises a first section having a generally recessed configuration and a first thickness, and a second section having a generally planar configuration and a second thickness. The second section comprises a first region extending between the first section and a first terminal edge of the living hinge, and a second region extending between the first section and an opposing second terminal edge of the living hinge. The second thickness is greater than the first thickness.

15 Claims, 5 Drawing Sheets

U.S. PATENT DOCUMENTS

| | | |
|---|---|---|
| 8,079,180 B2 * | 12/2011 | Titz ............................ 49/490.1 |
| 8,104,227 B2 * | 1/2012 | Tamura .......................... 49/377 |
| 8,127,499 B2 * | 3/2012 | Iacovoni et al. ................ 49/441 |
| 8,151,521 B2 * | 4/2012 | Iwabuchi ........................ 49/502 |
| 2003/0133765 A1 * | 7/2003 | Capriotti ....................... 408/224 |
| 2005/0155293 A1 * | 7/2005 | Dron ............................. 49/490.1 |
| 2007/0101656 A1 * | 5/2007 | Stipp ............................ 49/490.1 |
| 2008/0250721 A1 * | 10/2008 | Hayakawa et al. ........... 49/475.1 |
| 2008/0294083 A1 * | 11/2008 | Chang et al. ................... 602/28 |
| 2009/0178343 A1 * | 7/2009 | Zimmer et al. .............. 49/475.1 |
| 2009/0241430 A1 * | 10/2009 | Knape .......................... 49/489.1 |
| 2010/0011671 A1 * | 1/2010 | Gentemann ................... 49/489.1 |
| 2010/0305407 A1 * | 12/2010 | Farley .......................... 600/206 |
| 2010/0313488 A1 * | 12/2010 | Liang et al. ..................... 49/506 |
| 2011/0025688 A1 * | 2/2011 | Schneider et al. ............ 345/420 |
| 2011/0099911 A1 * | 5/2011 | Ellis et al. .................... 49/493.1 |
| 2011/0162285 A1 * | 7/2011 | Lichtner et al. .............. 49/490.1 |
| 2011/0167732 A1 * | 7/2011 | Brancaleone et al. ....... 49/475.1 |
| 2011/0196275 A1 * | 8/2011 | Chang et al. ..................... 602/6 |
| 2012/0024230 A1 * | 2/2012 | Li et al. ..................... 118/723 R |

* cited by examiner

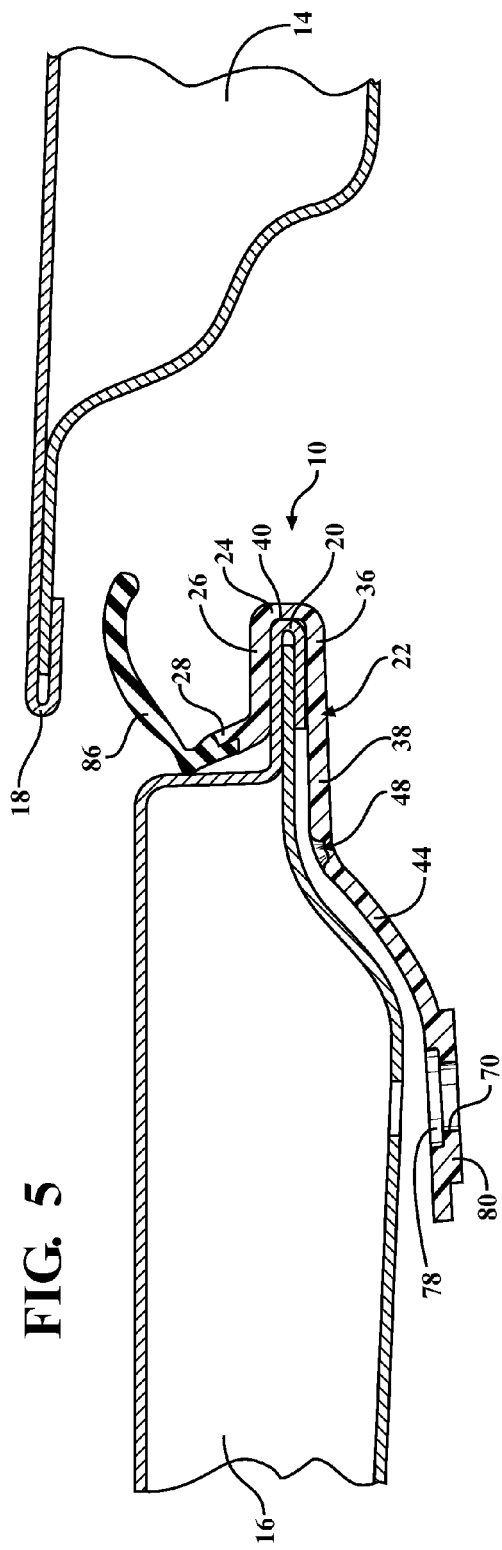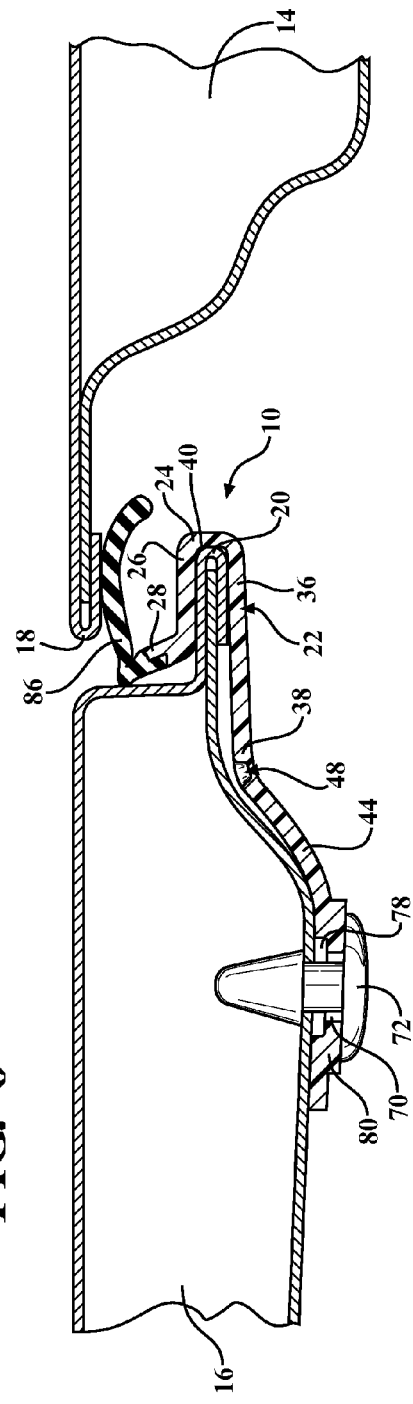

_US 8,474,188 B2_

CARRIER HAVING A LIVING HINGE

BACKGROUND OF THE INVENTION

1. Field of the Invention

The subject invention generally relates to a weatherstrip assembly for a motor vehicle and more specifically to the manner in which the weatherstrip assembly attaches to the motor vehicle.

2. Description of Related Art

Various weatherstrip assemblies for motor vehicle are known in the art. For example, a weatherstrip assembly can have a carrier with a generally U-shaped configuration for mounting to a motor vehicle. The carrier typically includes a tab for preventing the carrier from detaching from the motor vehicle. A hinge is disposed between the carrier and the tab for allowing flexibility during fastening of the tab to the motor vehicle. The hinge has a uniform thickness across an entire width of the hinge. The uniform thickness of the hinge is less than a thickness of the tab or u-shaped configuration of the carrier. In other words, the uniform thickness across the entire width of the hinge is thin to facilitate movement of the tab. However, the durability of the hinge can be an issue in certain applications.

Therefore, there remains an opportunity to provide a weatherstrip assembly including a living hinge having adequate flexibility, but improved durability.

SUMMARY OF THE INVENTION AND ADVANTAGES

The invention provides a weatherstrip assembly for a motor vehicle. The weatherstrip assembly includes a carrier having a base. The carrier has a first leg extending away from the base to a first distal end. The weatherstrip assembly has a seal mounted to the first distal end of the first leg of the carrier. The carrier also has a second leg extending away from the base to a second distal end. The first and second legs are spaced from each other to define a channel. At least one securing flange is coupled to the second distal end of the second leg for fastening the carrier to the motor vehicle. The weatherstrip assembly has a living hinge disposed between the securing flange and the second distal end of the second leg, such that the securing flange is moveable independent of the carrier. The living hinge comprises a first section having a generally recessed configuration and a first thickness, and a second section having a generally planar configuration and a second thickness. The second section comprises a first region extending between the first section and a first terminal edge of the living hinge, and a second region extending between the first section and an opposing second terminal edge of the living hinge. The second thickness is greater than the first thickness.

One advantage of the present invention is the second thickness of the second portion of the living hinge is greater than the first thickness of the first portion for exceeding previous durability levels and extending the useful life of the living hinge. Another advantage is the first thickness of the first portion of the living hinge is less than the second thickness of the second portion of the living hinge for increasing flexibility of the living hinge. Increased flexibility is useful during fastening of the securing flange to the motor vehicle. Therefore, balancing the first thickness and the second thickness improves durability and flexibility of the living hinge, which improves the useful life of the weatherstrip assembly.

BRIEF DESCRIPTION OF THE DRAWINGS

Other advantages of the present invention will be readily appreciated, as the same becomes better understood by reference to the following detailed description when considered in connection with the accompanying drawings.

FIG. 5 is a cross-sectional view of the front door in an open position, the rear door in the closed position, the carrier mounted to the rear door and the securing flange in an unattached position.

FIG. 6 is a cross-sectional view of the front and rear doors in the closed position, the securing flange in an attached position with and a seal engaging the front door.

DETAILED DESCRIPTION OF THE INVENTION

Referring to the Figures, wherein like numerals indicate like or corresponding parts throughout the several views, a weatherstrip assembly 10 for a motor vehicle 12 is generally illustrated in FIGS. 1-4. The motor vehicle 12 has a front door 14 and a rear door 16 adjacent to each other. In certain applications, the weatherstrip assembly 10 is coupled with the rear door 16. However, it has been contemplated that the weatherstrip assembly 10 of the subject invention can be coupled to the front door 14 or any suitable location as needed in other applications.

Figure 1:
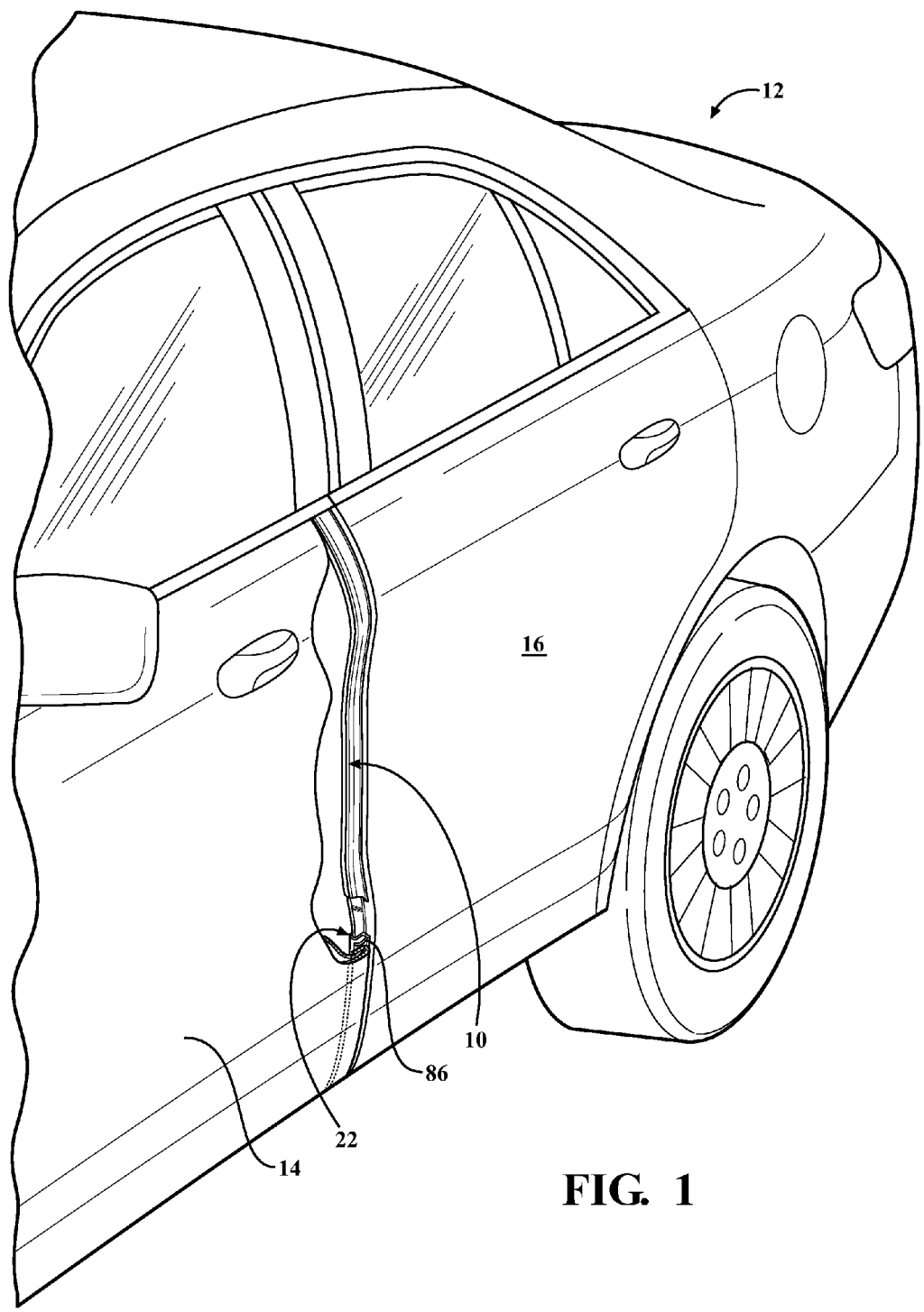
FIG. 1 is a fragmented perspective view of an outside of a motor vehicle having a front and rear door in a closed position with a weatherstrip assembly mounted to the rear door of the motor vehicle.
Figure 2:
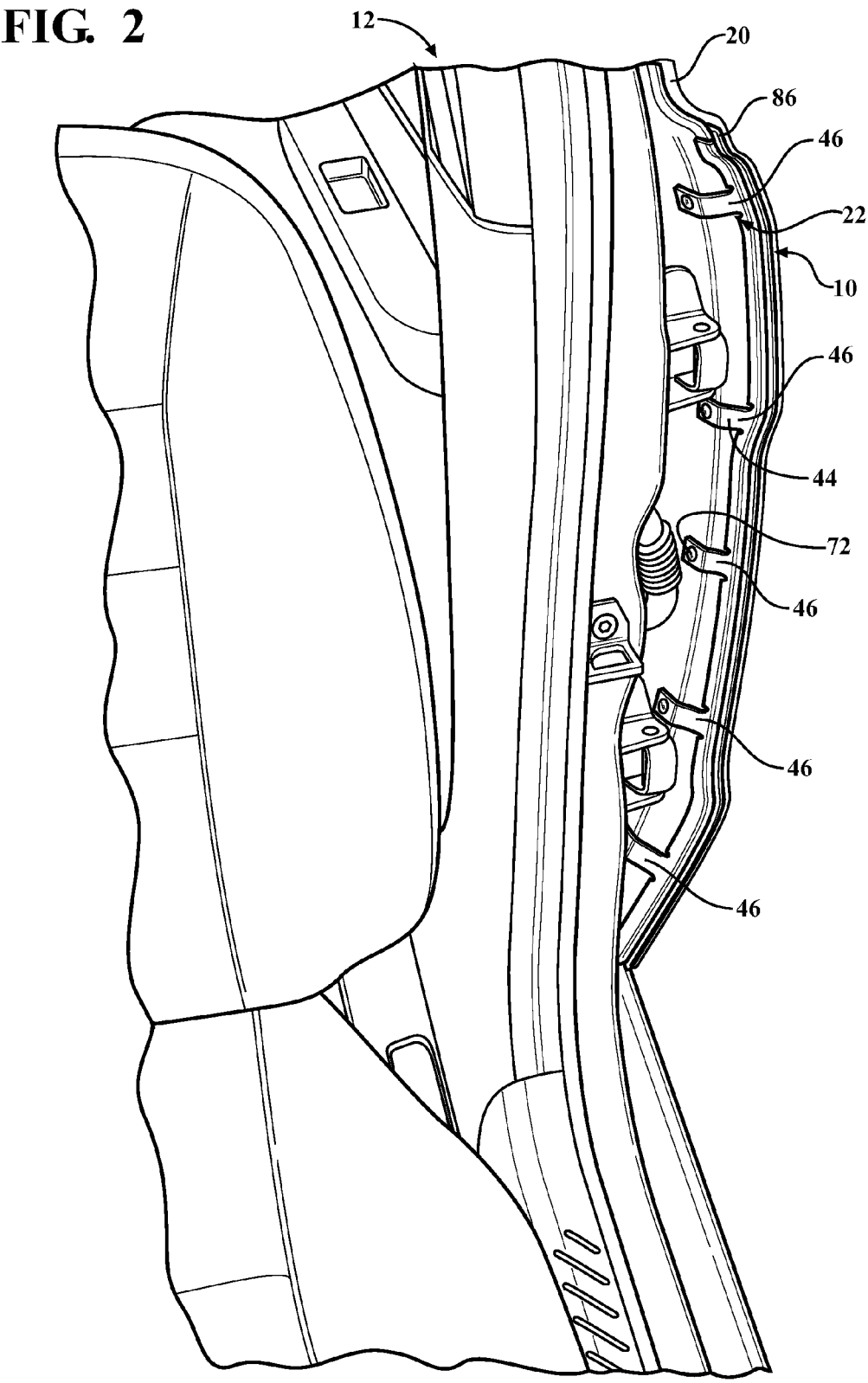
FIG. 2 is a fragmented perspective view of an inside of the motor vehicle with the weatherstrip assembly mounted to the rear door.

Referring also to FIGS. 5 and 6, when the front door 14 and the rear door 16 are in the closed position, a void is present between a rear end 18 of the front door 14 and a front end 20 of the rear door 16. The weatherstrip assembly 10 of the present invention fills the void between the rear end of the front door 14 and the front end of the rear door 16, as illustrated in FIGS. 1 and 2.

The weatherstrip assembly 10 includes a carrier 22 having a base 24. The carrier 22 has a first leg 26 extending from the base 24 to a first distal end 28. The weatherstrip assembly 10 also includes a seal 86 mounted to the carrier 22. More specifically, the seal 86 is coupled to the first distal end 28 of the first leg 26. The seal 86 is visible from outside the motor vehicle 12 filling the void between the front door 14 and the rear door 16. The seal 86 engages the front door 14, when the front door 14 is in the closed position, for sealing the front door 14 and the rear door 16 of the motor vehicle 12.

The seal 86 is typically black in color, so that the seal 86 can function unnoticed. However, the seal 86 could be any color to either match or contrast with the color of the motor vehicle 12. The seal 86 is typically made of a polymeric material. More specifically, the seal 86 is an elastomeric material. Although, the polymeric material may be further defined in other embodiments as a thermoplastic material, an elastomeric material, and/or any other suitable polymeric material.

The carrier 22 also has a second leg 36 extending away from the base 24 to a second distal end 38. At least a portion of the first leg 26 and the second leg 36 are substantially parallel to each other and are spaced from each other to define a channel 40, as illustrated in FIGS. 3-7. The channel 40 of the carrier 22 receives the door for mounting the weather assembly thereon, as best illustrated in FIGS. 5 and 6.

Figure 3:
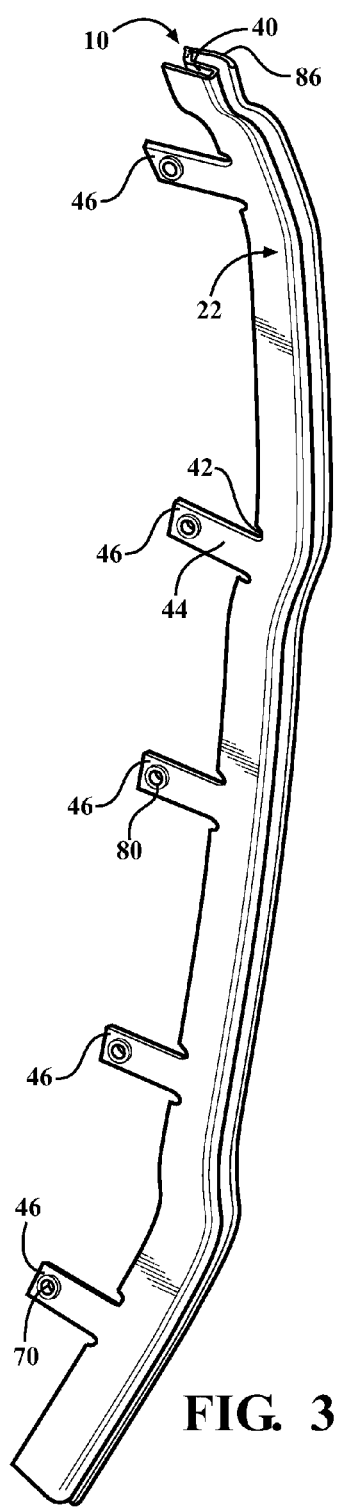
FIG. 3 is a perspective rear view of the weatherstrip assembly having a carrier and a plurality of securing flanges extending from the carrier and spaced from each other.
Figure 4:
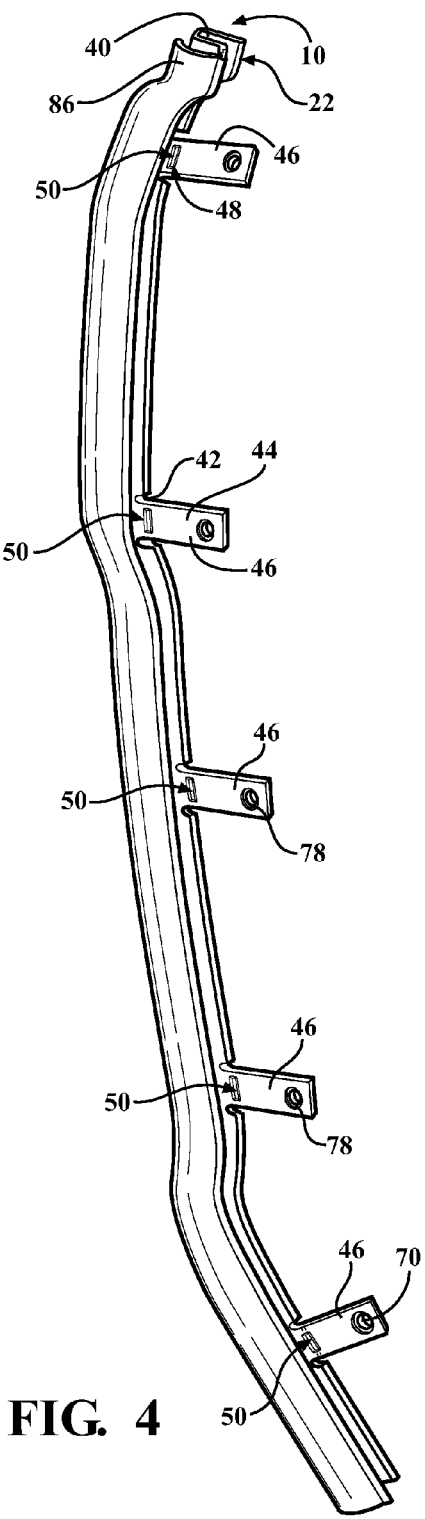
FIG. 4 is a perspective front view of the weatherstrip assembly having the carrier and the plurality of securing flanges extending from the carrier and spaced from each other.

The carrier 22 has at least one securing flange 44 coupled to the second distal end 38 of the second leg 36. More specifically, the at least one securing flange 44 is further defined as a plurality of securing flanges 46, as shown in FIGS. 2, 3, and 4. The securing flange 44 is used for fastening the carrier 22 to the motor vehicle 12 and will be described in greater detail below.

Figure 7:
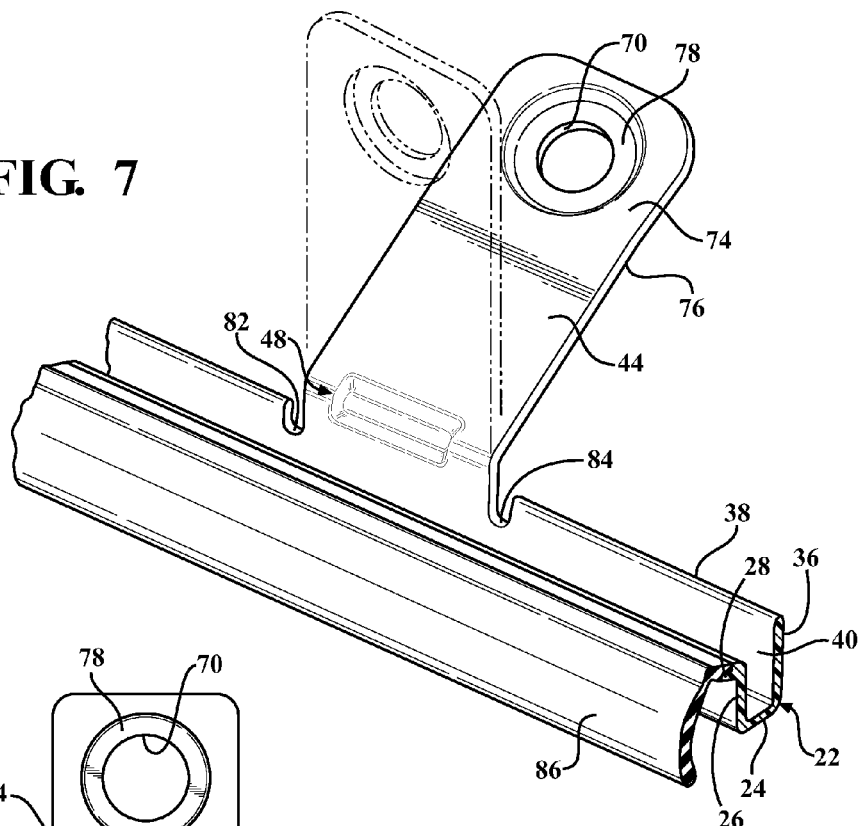
FIG. 7 is a fragmented perspective view of the seal attached to the carrier and a living hinge disposed between the securing flange and the carrier.
Figure 8:
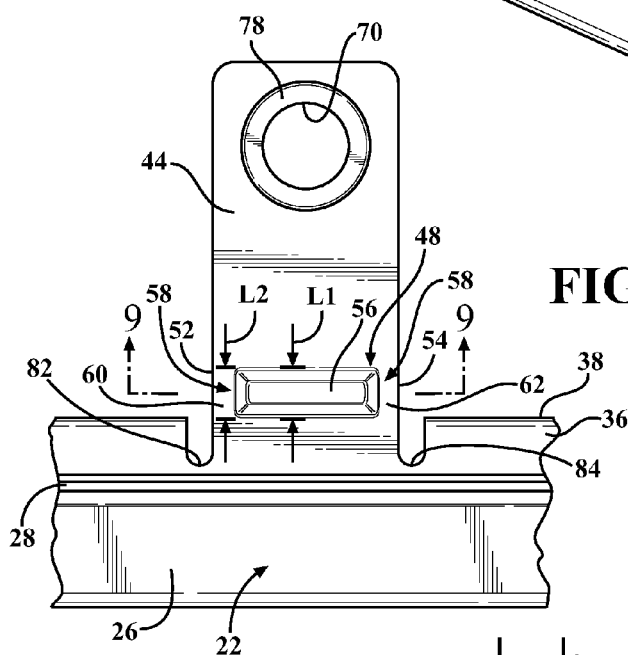
FIG. 8 is a fragmented plan view of the carrier, the living hinge, and the securing flange.
Figure 9:
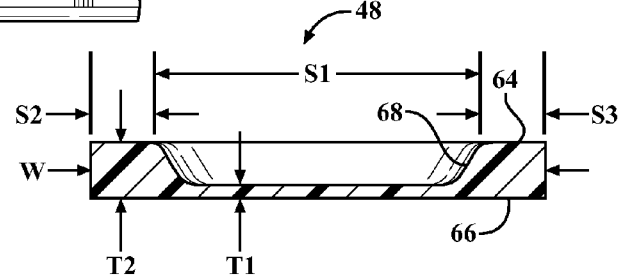
FIG. 9 is a cross-sectional view taken along line 9-9 of FIG. 8 revealing a first thickness, a second thickness, and a recess of the living hinge.

Referring also to FIGS. 7-9, the carrier 22 has a living hinge 48. It is to be appreciated that the carrier 22 having the plurality of securing flanges 44, will also have a plurality of living hinges 50, as illustrated in FIG. 4. The living hinge 48 is disposed between the securing flange 44 and the second distal end 38 of the second leg 36. The living hinge 48 allows the securing flange 44 to move independent of the carrier 22. Movement of the securing flange 44 occurs between an unattached position shown in FIG. 5, and an attached position shown in FIG. 6. The living hinge 48 has a first edge 52 and a second edge 54. As shown in FIG. 8, the first edge 52 and the second edge 54 are opposing each other. As such, the first edge 52 and second edge 54 are further defined as a boundary for the living hinge 48.

As best seen in FIGS. 8 and 9, the living hinge 48 has a first portion or section 56 and a second portion or section 58. The first portion 56 defines a first thickness T1 and the second portion 58 defines a second thickness T2 greater than the first thickness T1 for improving durability of the living hinge 48. Likewise, the first thickness T1 is less than the second thickness T2 for improving the flexibility of the living hinge 48. The concept of improving flexibility is described further below.

The living hinge 48 has a width W extending between the edges. More specifically, the first portion 56 extends along a first section or region S1 of the width W and the second portion 58 extends along a second section or region S2 of the width W. In the preferred embodiment, the second section S2 is defined as being less than the first section S1. The second section S2 is further defined as being less than 50% of the width W. In the most preferred embodiment, the first section S1 is 13.35 mm wide and the second section S2 is 1.76 mm wide.

The second portion 58 is disposed between the first edge 52 and the first portion 56. More specifically, the second portion 58 includes a first segment 60 disposed between the first edge 52 and the first portion 56 and a second segment 62 disposed between the second edge 54 and the first portion 56. The first segment 60 of the second portion 58 extends along the second section S2 of the width W. The second segment 62 of the second portion 58 extends along a third section or region S3 of the width W. As discussed above, the first section S1 is most preferably 13.35 mm wide and the second section S2 is most preferably 1.76 mm wide. In one embodiment, the third section S3 has a width equal to the second section S2, i.e. 1.76 mm wide. A sum of the first, second, and third sections preferably equal the entire width W. As such, the width W preferably equals 16.87 mm. In a preferred embodiment, a sum of said second and third sections of the width W is less than the first section Si of the width W. However, it is to be appreciated that other embodiments of the hinge may include more or less portions having varying widths and thicknesses of those portions.

The first portion 56 has a first length L1 extending transverse to the width W. The second portion 58 has a second length L2 also extending transverse to the width W. The second length L2 is equal to the first length L1, in the preferred embodiment, each of the first length L1 and second length L2 are less than the width W of the living hinge 48.

As best shown in FIG. 9, the living hinge 48 has a first front side 64 and a first back side 66 opposing the first front side 64. The first portion 56 defines a recess 68 in the first front side 64 which extends toward the first back side 66. Therefore, the recess 68 represents a lack of material in the first portion 56 resulting in the first thickness T1 being less than the second thickness T2 of the second portion 58, thereby increasing flexibility of the living hinge 48. In one alternative, the recess 68 may extend from the first back side 66 toward the first front side 64. In another alternative, a recess 68 may extend from both the first front side 64 and the first back side 66 thereby defining a pair of opposing recesses.

The securing flange 44 defines an aperture 70 for receiving a fastener 72 to secure the carrier 22 to the motor vehicle 12. In the present invention the securing flange 44 is fastened to the rear door 16 of the motor vehicle 12, as seen in FIGS. 2 and 6. The aperture 70 is generally circular in configuration. Alternatively, it has been contemplated that the aperture 70 may be oval in configuration or any other suitable configuration. In another embodiment, the fastener 72 may be molded to or integrated formed with the securing flange 44 during molding of the carrier 22.

The securing flange 44 further includes a second front side 74 and a second back side 76 opposing each other. The securing flange 44 also defines a depression 78 extending inwardly from the second front side 74 to the second back side 76. The securing flange 44 further defines a protrusion 80 extending outwardly away from the second back side 76 such that the protrusion 80 aligns with the depression 78. The protrusion 80 also defines the aperture 70 extending through. In other words, the aperture 70 extends through the securing flange 44 and the protrusion 80. The depression 78 and the protrusion 80 allow for reinforcing the aperture 70 while fastening the securing flange 44 of the carrier 22 to the motor vehicle 12.

The second leg 36 defines at least one slot 42. The slot 42 is adjacent to the first edge 52 of the living hinge 48. As illustrated in FIGS. 7 and 8, the slot 42 is further defined as a first slot 82 adjacent to the first edge 52 and further includes a second slot 84 adjacent to the second edge 54 of the living hinge 48. The slots 42 allow additional movement of the second leg 36 independent of the carrier 22 for improving durability during installation.

The carrier 22 is formed of a rigid material, which enables the carrier 22 to retain its shape. As such, the rigid material enables the legs of the carrier 22 to retain their shape, such that the channel 40 is able to receive the rear door 16 for mounting the weather assembly. The securing flange 44, the living hinge 48, the second leg 36 are integrally formed of a polymeric material. More specifically, the first leg 26, the second leg 36, the base 24, the securing flange 44, and the living hinge 48 are integrally formed of the polymeric material. In one embodiment, the polymeric material is further defined as a nylon-reinforced polyproplene. For example, the polymeric material for the first leg 26, the second leg 36, the base 24, the securing flange 44, and the living hinge 48 can be further defined as the nylon-reinforced polyproplene, such as talc. Of course, the polymeric material could be made of materials other than the nylon-reinforced polyproplene. It is to be appreciated that the first portion 56 and the second portion 58 of the living hinge 48 may be formed having metals, glass, organic binders or any other materials to yield properties suitable for the weatherstrip assembly 10 of this invention.

It is to be understood that the terminology which has been used herein is intended to be in the nature of words of description rather than of limitation. Many modifications and variations of the present invention are possible in light of the above description and teachings. The invention may be practiced otherwise than as specifically described within the scope of the appended claims. Additionally, although the Figures are not necessarily to scale, it is be understood that the Figures do accurately represent relative ratios in the size and dimensions between the various discrete components of the weatherstrip assembly of this invention.

What is claimed is:

1. A weatherstrip assembly for a motor vehicle, said assembly comprising:
    a carrier having a base, a first leg extending from said base to a first distal end and a second leg extending from said base to a second distal end with said legs spaced from each other to define a channel;
    a seal mounted to said first distal end of said first leg;
    at least one securing flange coupled to said second distal end of said second leg for fastening said carrier to the motor vehicle;
    a living hinge disposed between said securing flange and said second distal end of said second leg such that said securing flange is moveable independent of said carrier; and
    said living hinge comprising a first section having a generally recessed configuration and a first thickness, and a second section having a generally planar configuration and a second thickness with said second section comprising a first region extending between the first section and a first terminal edge of the living hinge and a second region extending between the first section and an opposing second terminal edge of the living hinge, wherein the second thickness is greater than the first thickness.

2. A weatherstrip assembly as set forth in claim 1, wherein said living hinge has a width extending between said first and second terminal edges, and wherein a width of said second section is less than a width of said first section.

3. A weatherstrip assembly as set forth in claim 2, wherein said width of said second section is less than 50% of said width of said living hinge.

4. A weatherstrip assembly as set forth in claim 2, wherein said first section is 13.35 mm wide and said second section is 1.76 mm wide.

5. A weatherstrip assembly as set forth in claim 2, wherein said first section has a first length extending transverse to said width and said second section has a second length extending transverse to said width with said second length equal to said first length with each of said first and second lengths being less than said width of said living hinge.

6. A weatherstrip assembly as set forth in claim 1, wherein said living hinge has a first front side and a first back side opposing said first front side with said first section defining a recess in said first front side extending toward said first back side.

7. A weatherstrip assembly as set forth in claim 1, wherein said second leg defines at least one slot adjacent to one of said first and second terminal edges of said living hinge for allowing movement of said second leg independently of said carrier for improving durability.

8. A weatherstrip assembly as set forth in claim 7, wherein said at least one slot is further defined as a first slot adjacent to said first terminal edge and further including a second slot adjacent to said second terminal edge.

9. A weatherstrip assembly as set forth in claim 1, wherein said securing flange defines an aperture for receiving a fastener to secure said carrier to the motor vehicle.

10. A weatherstrip assembly as set forth in claim 9, wherein said securing flange has a second front side and a second back side opposing each other with said securing flange defining a depression extending inwardly from said second front side to said second back side and a protrusion extending outwardly away from said second back side such that said protrusion aligns with said depression and further includes said aperture for countersinking said fastener and reinforcing said aperture while fastening said securing flange of said carrier to the motor vehicle.

11. A weatherstrip assembly as set forth in claim 1, wherein said first distal end of said first leg has a lip extending away from said first distal end and said lip defines a notch extending inwardly toward said first distal end such that said lip presents a shoulder for receiving said seal.

12. A weatherstrip assembly as set forth in claim 1, wherein said securing flange, said living hinge, said second leg are integrally formed of a polymeric material.

13. A weatherstrip assembly as set forth in claim 12, wherein said first and second legs, said base, said securing flange, and said living hinge are integrally formed of said polymeric material.

14. A weatherstrip assembly as set forth in claim 12, wherein said polymeric material is further defined as a thermoplastic.

15. A weatherstrip assembly as set forth in claim 1 wherein said first and second legs, said base, said securing flange, and said living hinge are integrally formed of nylon-reinforced polypropylene.

* * * * *